Patented May 26, 1953

2,640,040

UNITED STATES PATENT OFFICE 2,640,040

NONSWEATING STABILIZED WAX COMPOSITION AND PROCESS OF MAKING THE SAME

Rodney L. Lehman, Pomona, Calif., assignor to Brogdex Company, Pomona, Calif., a corporation of California No Drawing. Application November 21, 1949, Serial No. 128,680

6 Claims. (Cl. 260—28.5)

1

This invention pertains to improvements in the preparation and composition of protective coatings and the development of new and highly beneficial and valuable characteristics in protective coating materials.

In the treatment of fresh fruit and vegetables for the purpose of retarding ripening during storage and shipment, reducing loss in weight during transportation and merchandising, maintaining a natural, characteristic texture and appearance of the skin or rind, protecting the fruit or vegetable from decay or deterioration due to the presence and growth of molds and fungi, enhancing the appearance of the fruit or vegetable, and any one or more of such purposes or results attained by the treatment, a composition containing paraffin wax and a refined mineral oil as its major constituents has been found to have a wide range of uses and great utility. Other protective materials, such as harder vegetable and mineral waxes are often incorporated in the protective coating composition. Such compositions may assume various forms, from solid slabs containing ninety per cent (90%) paraffin wax and only ten per cent (10%) oil to pastes in which the paraffin and oil are in substantially equal proportions. In some instances mineral oils or petroleum distillates are employed as carriers or solvents for the wax, and in other instances paraffin wax and other harder waxes are dispersed in aqueous media to form suspensions or emulsions which are then applied to the fruit and vegetables. Many prior patents relate to compositions and treatments of the character referred to hereinabove and among them reference can be had to Patents Nos. 1,809,016, 1,827,219, 1,846,143, 1,940,530, and 1,943,468.

The incorporation of a normally liquid hydrocarbon component, such as highly refined mineral oil, in a normally solid wax composition (composed essentially of paraffin wax but sometimes including harder waxes or hydrogenated vegetable oils) has not been free from difficulties. Paraffin is soluble in only limited amounts in petroleum oils and it is difficult to incorporate and maintain say twenty per cent (20%) or more oil uniformly throughout the slab of wax. During storage and shipment of these protective compositions, temperature changes are encountered which tend to cause the components to separate, even though the composition was originally prepared with great care and the use of colloid mills in order to insure fine dispersion of the oil and homogeneity in the product. These temperature changes have on occasion caused

2 twenty per cent (20%) to forty per cent (40%) of the oil contained in the composition to separate as a distinct layer in containers in which the wax composition is stored and shipped.

Moreover, slabs of waxy protective coating material containing oil have, upon standing, exuded or "sweated" their contained oil, even at normal atmospheric temperatures, thereby making it difficult to lift, handle, and install the slabs in the waxing and polishing machines used in fruit and vegetable packing plants, such as citrus (orange, lemon, and grapefruit) packing houses, and tomato, apple, and other packing plants. Not only do the slabs become slippery and difficult to handle, but in addition, they leave or deposit oily residues when stacked or stored on shelves, these residues being unsightly and increasing the always present hazard of fire. Concomitantly, the exudation of oil impairs and changes the composition of the slabs; in some instances the changes are sufficient to prevent the use of the slabs for their intended purpose under the conditions of temperature, brushing speed, character of fruit and rind or skin to which it was intended to apply the protective coating, etc. The spreadability of the coating is modified, and the thickness of the coating, its character and effect on the shrinkage or weight loss obtained upon storage of the treated fruit or vegetable will show marked and sometimes disastrous deviation from the standards or objectives desired.

These problems of long standing have been the subject of long and intensive experimentation which has been aggravated by the incompatability of paraffin. The present invention, made during the course of such experimentation, is based upon the surprising discovery that linear polymers of ethylene, for reasons not well understood, exert a remarkable stabilizing effect upon protective coating compositions composed essentially of paraffin and oil, without deleteriously affecting the color, transparency, spreadability, and gloss-imparting and shrinkage controlling characteristics.

The present invention, therefore, relates to the preparation and production of protective coating compositions, particularly adapted for use on fruits and vegetables, consisting essentially of wax and oil, the protective coating composition containing a polymer or polymers of ethylene and being characterized by its stability, homogeneity, and freedom from sweating.

It is an object of the present invention to disclose and provide steps and means for use in the preparation of protective coatings particularly adapted for use in the fruit and vegetable treating industry.

Another object is to disclose and provide methods of producing waxy, protective coating compositions composed essentially of paraffin and mineral oil, said compositions being characterized by their enhanced homogeneity and stability.

A still further object of the invention is to disclose and provide waxy protective coating compositions normally solid at atmospheric temperatures such compositions containing appreciable quantities of normally liquid oils, the compositions being further characterized by the presence of polyethylene resins composed essentially of linear polymers of ethylene, whereby desirable characteristics are imparted to the protective coating.

These and various other objects and advantages of the invention with become apparent to those skilled in the art from the description and discussion given hereinabove and appearing hereafter.

As previously indicated, the application of protective coatings to fruits and vegetables is hemmed in by a large number of requirements. The protective coating should be of a substantially transparent character; it should not be translucent or impart a milky or somewhat opaque appearance to the surface of the fruit, nor mask the original color of the fruit. It should not exhibit flaking, nor should it be sufficiently soft, moist, slimy, or slippery to change the characteristic texture or feel of fresh fruit and vegetables. The coating should not exert an injurious effect upon the tender skin or rind of the fruit. At the same time, the protective coatings should be capable of being spread and distributed over the surface of the fruit in an almost imperceptibly thin discontinuously associated film capable of preventing undesired evaporation of moisture from the fruit with resultant shrinkage and at the same time incapable of smothering the fruit and preventing the natural breathing or transpiration of the fruit.

As previously indicated, protective coating compositions composed essentially of a waxy, normally solid material and a liquid non-injurious oil have been found to be eminently suited for the problems facing the industry. It is, in many instances, desirable to use relatively large amounts of the liquid oil, say twenty-five per cent (25%), or even fifty per cent (50%), by weight of the total oil-wax mixture, but it is not desirable to reduce the melting point of the mixture unduly, since the coated or treated fruit would then be slimy or tacky when offered for sale, particularly during warm weather.

Paraffin commonly employed in the manufacture of these protective coatings has a melting point of about 125° F. In a specific example, when paraffin having a melting point of 125.5° F. was used, the addition of ten per cent (10%) of a refined mineral oil (medicinal grade) by weight reduced the melting point to 120.5° C. When fifty per cent (50%) of such oil was used, the melting point of the mixture was reduced to 107.2° F. It has been discovered that the incorporation of very small quantities of polymers of ethylene not only increases the melting point of the product, but in addition produces a number of other highly desirable effects. The incorportation of one per cent (1%) by weight of polymer of ethylene restored the melting point of a composition composed of ninety per cent (90%) paraffin and ten per cent (10%) of the refined mineral oil to 125.5° F., whereas, without such ethylene polymer, the melting point was only 120.5° F. The incorporation of but one-half per cent (½%) of such polymer of ethylene increased the melting point from 120.5° to 123.6° F. The addition of only 0.2% by weight of polyethylene resin (having a mean molecular weight of about 4000) to a composition comprising 75% paraffin and 25% oil reduced the melting point from 118.8° F. to 117.8° F.; the addition of 0.5% resulted in a melting point of 118.5° F. and the addition of 1.0% resulted in a composition having a melting point of 120.2° F.

The polyethylene resins referred to herein are composed essentially of linear polymers of ethylene and have an average molecular weight of between about three thousand (3000) and ten thousand (10,000). Ordinarily polymers having a molecular weight of between about three thousand (3000) and five thousand (5000) are to be preferred, since polymers with higher molecular weight do not enhance the spreadability of the resulting composition upon the fruit. These polymers, moreover, have softening points of between about 90° C. and 106° C., those having softening points of about 92° C. to 96° C. being preferred.

In the manufacture of the protective coating compositions which are to be used in slab form and then brushed upon the fruit, the paraffin and normally liquid oil is intimately mixed by normal hot flux methods. The polyethylene resin may be added directly to the batch (with accompanying agitation and circulation), or it may be first incorporated in a part of the paraffin and then added to the main body of the batch. From about 0.2% to about 2% of the resin by weight of the mixture gives good results.

The results obtained by this relatively simple procedure are rather extraordinary. In the first place, the manufacture of the coating composition is simplified somewhat in that the polyethylene resin appears to facilitate the blending of relatively large proportions of oil with the paraffin. The resulting cakes or slabs exhibit amorphous characteristics instead of being soft and crystalline. The crystallization of the paraffin appears to be inhibited and the mutual solubility of paraffin and oil appears to be enhanced, the resulting slabs or cakes being more homogeneous in character. There is no separation of oil and no appreciable sweating even on warm days and, as a result, the slabs or cakes can be handled with greater facility and no loss of oil occurs upon storage or standing. The coating composition therefore maintains its uniformity and does not vary with storage or age. In use, it has been found that the compositions exhibit an increase in spreadability as well as a more uniform spreadability; a better shrinkage control is obtained; the coatings produced upon the surface of the fruit or vegetable being treated are not translucent nor milky; the coatings do not exhibit flaking, no injurious effects can be observed upon the tender skin or rind and the gloss is equal to or in some instances even superior to the gloss obtained with the prior compositions.

It is to be understood that although particular emphasis has been laid hereinabove upon coating compositions consisting essentially of paraffin wax and a refined white mineral oil, the invention is applicable to any protective coating composition composed of a spreadable, normally solid wax and a normally liquid oil. Instead of paraffin alone, other waxes such as beeswax, candelilla, carnauba, ozocerite, and montan wax may be used, either alone or in combination with paraffin. Any oil compatible with the normally solid wax may be employed, and though mineral oils are preferred, some of the glyceride oils can be used, although their use is not recommended. Furthermore, the polyethylene resin can be chlorinated in part at least, without impairing the results obtained.

It may also be noted that, although specific reference has been made, in the examples given, to the production of slab wax or coating compositions in slab or cake form, the polyethylene resin may be used as a blending agent where the waxy material is applied to the fruit in molten or atomized condition, or where the waxy components of the protective coating (including the polyethylene resin) are dispersed in an aqueous medium to form a dispersion or emulsion to which the fruit or vegetable is then subjected, resulting in the deposition of a discontinuously associated film on the surface of such fruit or vegetable. The invention should not be limited to the examples given, nor to the enumeration of advantages specifically made since other advantages such as the increased resistance of the resulting film to the passage of moisture vapor therethrough could be mentioned as well as many other advantages which it is deemed unnecessary to describe in detail, since those skilled in the art will readily appreciate the benefits which can be derived from the invention hereinabove disclosed. It may be noted however, although the polyethylene resins produce films of enhanced resistance to the passage of water vapor, they appear to be permeable to oxygen, carbon dioxide and ethylene, thereby imparting highly desirable characteristics to fruit and vegetables provided with such films.

All changes and modifications coming within the scope of the appended claims are embraced thereby.

I claim:

1. A method of producing waxy protective coating compositions composed essentially of paraffin and mineral oil, said compositions being characterized by their enhanced homogeneity and stability, comprising: blending fifty per cent (50%) to ninety per cent (90%) of paraffin with fifty per cent (50%) to ten per cent (10%) of refined white mineral oil, by weight, while said paraffin is in liquid form, and incorporating in the composition, with agitation and circulation, from about 0.2% to about 2.0% of a polyethylene resin by weight of the composition, said resin having a mean molecular weight of between about three thousand (3000) and five thousand (5000).

2. A method of producing waxy protective coating compositions composed essentially of paraffin and mineral oil, said compositions being characterized by their enhanced homogeneity and stability, comprising: blending fifty per cent (50%) to ninety per cent (90%) of paraffin with fifty per cent (50%) to ten per cent (10%) of refined mineral oil, by weight, while said paraffin is in liquid form, and incorporating in the composition, with agitation and circulation, from about 0.2% to about 2.0% of a polyethylene resin by weight of the composition, said resin having an average molecular weight of between about three thousand (3000) and ten thousand (10,000) and a softening point of between about 90° C. and 106° C.

3. A waxy, readily spreadable, protective coating composition adapted for use in coating fruit and vegetables, comprising: from 90% to 50% by weight of paraffin wax; from 10% to 50% by weight of added refined mineral oil; and from 0.2% to 2% by weight of a polyethylene resin composed essentially of linear polymers of ethylene, said polymers having an average molecular weight of between three thousand (3000) and ten thousand (10,000) and a softening point of between 90° C. and 106° C.

4. A waxy, protective coating composition adapted for use in coating fruit and vegetables, comprising: from 90% to 50% by weight of paraffin wax; from 10% to 50% weight of added refined mineral oil; and from 0.2% to 2% by weight of a polyethylene resin having an average molecular weight of between three thousand (3000) and five thousand (5000).

5. A waxy protective coating composition adapted for use in coating fruit and vegetables, comprising: from 90% to 50% by weight of paraffin wax having a melting point of about 125° F.; from 10% to 50% by weight of an added refined mineral oil; and from 0.2% to 2% by weight of a polyethylene resin having an average molecular weight of between about three thousand (3000) and ten thousand (10,000), said composition having a melting point of between about 120° F. and 125° F.

6. A method of producing waxy protective coating compositions composed essentially of paraffin wax and mineral oil; said compositions being characterized by their enhanced homogeneity and stability which comprises blending 90–50% of a normally solid paraffin wax with from about 10% to 50%, by weight of the total composition, of refined mineral oil, said solid paraffin wax being added when said wax is in liquid form, and incorporating in the composition from about 0.2% to about 2% of linear polymers of ethylene by weight of the composition, said polymers having an average molecular weight of between three thousand (3,000) and ten thousand (10,000) and a softening point between about 90° C. and 106° C.

RODNEY L. LEHMAN.

References Cited in the file of this patent

UNITED STATES PATENTS

| Number | Name | Date |
|---|---|---|
| 2,409,986 | Solo | Oct. 22, 1946 |
| 2,504,270 | MacLaren | Apr. 18, 1950 |

OTHER REFERENCES

"Commercial Waxes," 1944, by Bennett, published by the Chemical Publishing Company, New York, page 68.

British Plastics, March 1945, pages 94 to 96.
British Plastics, April 1945, pages 148 and 149.
British Plastics, May 1945, article entitled "Properties and Use of Polythene."

"The Chemistry and Technology of Waxes," 1947, by Warth, published by Reinhold Publishing Company, pages 225, 226, 240, and 242.

"Modern Packaging," June 1948, article entitled "Films for Cherries."

"Food Industries," June 1949, article entitled "'Poly' Wrap Seen Filling Packaging Needs."